Dec. 16, 1969 C. K. BECK ET AL 3,484,286
HIGH TEMPERATURE MAGNETIC TAPE
Filed Dec. 5, 1966
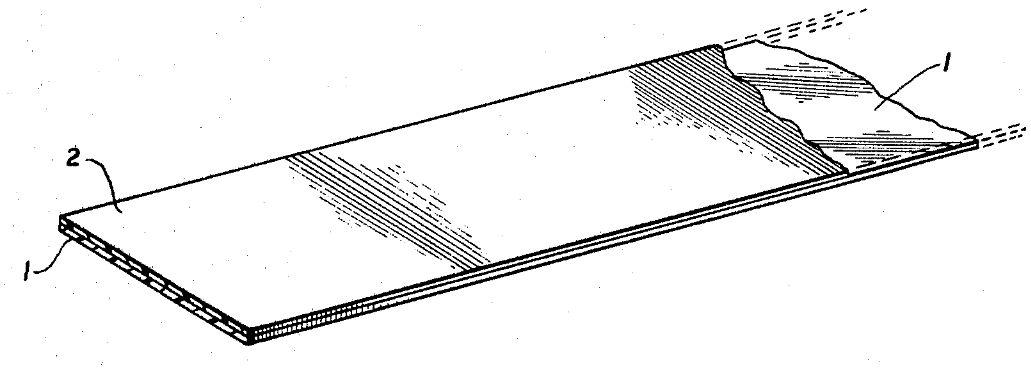
INVENTORS
CHARLES K. BECK
DAVID L. NOHE
BY Sandoe, Hopgood & Calimafde [signature]
ATTORNEYS United States Patent Office 3,484,286
Patented Dec. 16, 1969

3,484,286

HIGH TEMPERATURE MAGNETIC TAPE

Charles K. Beck, Danbury, and David L. Nohe, Brookfield, Conn., assignors to Reeves Industries, Inc., Danbury, Conn.

Filed Dec. 5, 1966, Ser. No. 599,001
Int. Cl. G11b *5/68, 5/78*
U.S. Cl. 117—235 2 Claims

ABSTRACT OF THE DISCLOSURE

A magnetic recording media, such as tape, comprises a polyimide substrate to at least one face of which is bonded a film containing a magnetic pigment dispersed in a binder consisting of a copolymer of vinylidene fluoride and hexafluoropropylene.

This invention relates to magnet recording media such as magnetic tape and, more particularly, relates to magnetic recording media capable of withstanding high temperatures.

Magnetic recording media normally consists of a substrate or web on one surface of which is applied a dispersion of a magnetic pigment in organic polymeric binders. The web, normally composed of polyethylene terephthalate or cellulose acetate, and the usual binders for the magnetic pigment are subject to thermal degradation.

In some applications, however, the tape must be capable of withstanding high temperatures without degradation. For example, in some applications, sterilization of the tape prior to use is desirable. In others, it is desirable to employ tapes capable of withstanding high operating temperatures without degradation and concomitant loss of the information stored thereon. In some particular stringent conditions, temperature extremes of both high and low temperatures are encountered and the tape must withstand such extremes.

It is, therefore, an object of the present invention to provide an improved magnetic recording media capable of withstanding temperature extremes.

In accordance with this object, there is provided, in a preferred embodiment of this invention, a magnetic recording media consisting of a polyimide substrate to one face of which is bonded a film containing magnetic pigment dispersed in a binder composed of a copolymer of vinylidene fluoride and hexafluoroproplyene which provides the necessary cohesion and adhesion both to hold the pigment in the desired dispersion and to bond the film to the substrate. In addition, other pigments such as anti-static pigments, additives, dispersants, internal lubricants, and stabilizers may be incorporated into the binder system, as will be explained in greater detail.

In some applications, a tape having a magnetic film on both sides of the tape is desired. Such films are contemplated within the scope of this application but the description will be directed at the film formation on the first face, recognizing that application of a film on the second face uses the same materials and processing steps.

Having briefly described this invention, it will be described in greater detail, along with other objects and advantages, in the following portions of the specification, which may best be understood by reference to the accompanying figure which is a perspective view partially broken away of a magnetic recording media in accordance with the present invention.

In the figure, there is shown a magnetic recording media consisting of a supporting web 1 to one surface of which is bonded a magnetic recording film 2. The magnetic recording film consists of magnetic pigment dispersed in an organic binder resistant to thermal degradation. Specifically, the recording media is capable of withstanding temperatures of the order of 450° F. for extended periods without degradation. The recording media possesses the attributes of excellent electrical response and mechanical properties at room temperatures, very low temperatures, and when subjected to temperature extremes, as will be described hereinafter, although high temperature operation is of primary concern since it has been a limiting factor of utilization.

The web is a polyimide web which is highly resistant to thermal degradation. The normal range of web thickness is from ¼ to 5 mils thick. For the great majority of recording applications, the web would consist of an elongated tape, one mil in thickness. A polyimide film satisfactory for this application is derived from reacting pyromellitic dianhydride with aromatic diamines, commercially obtainable under the trade name Kapton from E. I. du Pont de Nemours & Co., Wilmington, Del. This film operates in the temperature range of −450° F. to +750° F.

The magnetic film comprises a magnetic pigment, gamma ferric oxide, in an organic binder, a copolymer of vinylidene fluoride and hexafluoropropylene. The binder is capable of withstanding high temperature environments without degradation. Similarly, other pigments, dispersants, internal lubricants, stabilizers and other additives must be capable of withstanding high temperature environments without degradation. For application of the magnetic film, a liquid dispersion of the magnetic film system is made for ease of application to the web.

The dispersion in the liquid state may be described as being composed of two parts, a volatile portion and a nonvolatile portion.

The nonvolatile portion of the dispersion may be subdivided into several parts, namely pigments, binders, additives, and possibly, curing agents.

The pigments in this tape are gamma ferric oxide and optionally carbon black. It is, of course, the gamma ferric oxide which allows the tape to be used for recording purposes. Carbon black may be added as an anti-static pigment. Based on the nonvolatile portion of the dispersion, the total pigment may range from 50% to 85% by weight; the optimum being about 70%. Of this total pigment, the carbon black may range from 0% to 15%; the optimum being approximately 7%.

The binder must resist thermal degradation, and provide suitable properties of cohesion and adhesion to hold the pigment in the desired dispersion and to bond the dispersion to the polyimide web. A copolymer of vinylidene fluoride and hexafluoropropylene has been found suitable for such use. Such binders are commercially available under the trade names Viton A and Viton A–HV (high viscosity) from E. I. du Pont de Nemours & Co., Wilmington, Del. On the basis of the nonvolatile components, the binder may range from 15% to 50% by weight; the optimum being about 25%.

Various additives may be employed in this formulation in order to achieve certain desired effects.

In dispersing the pigments in this tape, it was found to be advantageous to add a dispersing agent. In order to insure thermal stability of all the components, it was necessary to eliminate from consideration the normal types of pigment dispersants. We were able to successfully use a fluorosilicone fluid, available commercially as FS1265 from Dow Corning Corp., Midland Mich., as a pigment dispersant in our system. This material has excellent lubricity and is reasonably stable at temperatures approaching 500° F. Based on the total pigment, the dispersant may range from 0% to 15%; the optimum being about 5%.

It was believed that it might be advantageous in most applications of a tape of this type to incorporate into the formulation an internal lubricant. The lubricant eliminates tape squeal over the magnetic recording or playback head. Again, a material was sought which would be resistant to thermal degradation. It was found that either polytetrafluoroethylene powder (for example TL–115, 5–10$\mu$ size—Liquid Nitrogen Processing Corp., Malvern, Pa.) or fluorinated ethylenepropylene copolymer powder (for example TL–120, 1–2$\mu$ size—Liquid Nitrogen Processing Corp.) made an effective lubricant. These materials give good service from −400° F. to +500° F. They were incorporated in the range of 0% to 40% by weight; the optimum being about 15% based on the total binder.

At extremely high temperatures, the binder of this system may decompose by a process of dehydrofluoronation which is autocatalytic. In order to stabilize against such possibilities when the application dictates, it is advisable to add one or more stabilizers which will react with the released hydrogen fluoride and, thus, break the chain reaction. Magnesium oxide is the preferred stabilizer and can be used in the range of 0% to 20% by weight; the optimum being 10% based on the total binder.

It will be noted that the specification of additives has been done in normal laboratory manner by computation of the amount of additive on the basis of the primary ingredients (i.e. pigment or binder). Thus, proper formulations can be made although it will be necessary to recompute percentage of ingredients for a specific formula to total 100%.

The volatile vehicle can comprise a plurality of organic solvents which carry or dissolve the polymeric binder. The volatile vehicle is so described because, in some cases, the nonvolatile portion of the magnetic film components is carried in the form of dispersions of polymer micelles. Other of the organic liquids actually dissolve the nonvolatile binder and, thus, are true solvents. In the system, however, it is immaterial whether the binder is carried in the form of a solution or dispersion. The volatile vehicles found useful in this system are: Acetone; methyl ethyl ketone; methyl isobutyl ketone; cyclohexanone; diisobutyl ketone; Pent-oxone (trademark of Shell Oil); isophorone; diacetone alcohol; ethyl acetate; n-butyl acetate; amyl acetate; tetrahydrofuran; 1,4-dioxane; N-methylpyrrolidone; N,N-dimethyl formamide; Cellosolve acetate (Cellosolve is a trademark of the Union Carbide Corporation); and 2-nitropropane.

Because of its ready availability, fast evaporation rate and good solvency, ethyl acetate has been preferred as the volatile constituent.

For application, the nonvolatile components are dissolved or dispersed in the volatile vehicle and the solution or dispersion applied to the substrate. The volatile component is then allowed to evaporate (usually assisted by moderate heating) leaving the magnetic film.

A typical example of processing the dispersion for this application is given in Example I:

EXAMPLE I

A solution of 5.6 grams of Viton A in 78.9 grams of ethyl acetate to which have been added 2.8 grams of FS1265, was placed in a small pebble mill. To this solution there was added 51.5 grams of HR–280 (gamma ferric oxide, Hercules Inc., Glen Falls, N.Y.), and 3.6 grams of Vulcan XC–72 (carbon black, Cabot Corp., Boston, Mass.). After dispersing the pigment for 49 hours, a solution of 13.8 grams of Viton A in 41.4 grams of ethyl acetate was added.

The dispersing was continued for an additional 24 hours and the resulting dispersion was coated on Kapton web. It showed good recording characteristics but only moderately high cohesive strength, as would be expected from a non-cross-linked thermoplastic elastomer.

In many applications, it is desirable to increase the cohesive strength by cross-linking the binder. The copolymer of vinylidene fluoride and hexafluoropropylene is a thermoplastic elastomer which may be cross-linked and cured thereby making it partially or wholly thermosetting. Curing of the copolymers, Viton A and Viton A–HV have been relatively well explained to the art. Curing may be accomplished by high energy radiation, by the addition of peroxide curing agents, by the addition of polyfunctional amines or by possible combinations thereof.

For this application, the use of high energy radiation is not economically feasible.

Peroxide cures may be useful in magnetic tape systems but have drawbacks due to handling hazards. For this reason, peroxide cures are not normally used for this application.

Addition of catalytic polyamine curing agents is compatible with processing of recording media, particularly magnetic tape. However, the heavily pigmented system of this application requires some variation from conventional processing.

For example, the use of hindered polyamines, the most successful of which is hexamethylenediamine carbamate, is well known as a catalyst for curing Viton A and Viton A–HV. Upon heating, the catalyst breaks down to liberate the polyamine which will catalyze the cross-linking of the Viton A or Viton A–HV. However, in this system, the heavy loading of magnetic pigment inhibits curing by a hindered polyamine agent.

The magnetic oxide pigment is acidic which appears to react with the polyamine released before effective cure is accomplished. Increasing the amount of the reagent might overcome this effect, but would leave excessive residue deposits in the magnetic film.

For this reason, non-hindered polyamines are preferably employed. The non-hindered polyamine, such as ethylene diamine, may be incorporated into the liquid system, applied topically, or both. The non-hindered polyamine, ethylene diamine, will catalyze the cross-linking of Viton A at room temperatures. However, baking is preferred to promote cure and to evaporate excess catalyst in order to limit the degree of cure.

When the curing agent is added to the dispersion, it is done in amounts ranging from 0% to 30% based on the Viton A; the optimum being about 10%.

One advantageous and effective method of topical application is to apply the polyamine solution at the time of calendering so that the calendering spreads the curing agent evenly over the surface and initiates the cross-linking by the heated roll. In this method, additional baking may be desirable to complete cross-linking and to evaporate any excess of the polyamine solution. A typical example of the details of processing is given in Example II.

EXAMPLE II

A solution of 5.0 grams of Viton A in 77.4 grams of ethyl acetate to which have been added 2.5 grams of FS1265, was placed in a small pebble mill. To this solution there was added 45.6 grams of HR–280 and 3.2 grams of Vulcan XC–72. Also incorporated in this dispersion were 2.6 grams of TL–115 (TFE powder, 5–10$\mu$, Liquid Nitrogen Processing Corp., Malvern, Pa.). After dispersing the pigment for 48 hours, a solution of 12.2 grams of Viton A in 36.7 grams of ethyl acetate was added. The dispersion was continued for an additional 24 hours and the resulting mix was coated on Kapton web.

Ethylene diamine was topically applied to the tape which was then heated to about 400° F. for approximately 24 hours. In most cases, less curing time can be used since complete curing it not always necessary. The resulting tape exhibits an extremely durable surface, excellent motion over the recorder head, and good recording characteristics.

Tape lengths made in accordance with Examples I and II were formed into loops and a signal recorded thereon. The tape loops were then run at 7½ i.p.s. and 15 i.p.s. through a blue flame from a Bunsen burner (approximately 1400° F.), across Dry Ice (approximately —250° F.) positioned 6–8 inches from the burner, and then over a playback head. The loop was subjected to continuous running in a loop for extended periods at each speed without mechanical deterioration (e.g. no flaking, no embrittlement) and with signal deterioration. Thus, the tape provides excellent properties at temperature extremes as well as under conditions of rapid cycling between extremes.

This invention may be variously modified and embodied.

We claim:

1. A magnetic recording media comprising a polyimide substrate to at least one face of which is bonded a film consisting of a dispersion of a magnetic pigment in an organic binder, said organic binder consisting of a copolymer of vinylidene fluoride and hexafluoropropylene.

2. The magnetic recording media of claim 1 in which the components of the film are, by percent by weight of 100% of the total of pigment and binder, pigment consisting of gamma ferric oxide 50–85%, organic binder 15–50%, and which includes, carbon black 0–15% of the total pigment, a fluorosilicone dispersing agent 0–15% of the total pigment, an internal lubricant from the group consisting of polytetrafluoroethylene powder and fluorinated ethylenepropylene copolymer powder 0–40% of the total binder, and a stabilizer consisting of magnesium oxide 0–20% of the total binder.

References Cited

UNITED STATES PATENTS

| | | | |
|---|---|---|---|
| 3,080,319 | 3/1963 | Arrington. | |
| 3,148,082 | 9/1964 | Di Ricco et al. | |
| 3,179,634 | 4/1965 | Edawrds | 117—136 X |
| 3,202,557 | 8/1965 | Kaufman. | |
| 3,111,426 | 11/1963 | Capron | 117—161 X |
| 3,242,005 | 3/1966 | Morita et al. | |
| 3,361,586 | 1/1968 | Lindsey | 117—161 X |
| 3,274,111 | 9/1966 | Sada et al. | |
| 3,319,125 | 5/1967 | Reed et al. | |

OTHER REFERENCES

Haines, Surface Treatment for Plated Tape Polymeric Base, February 1964, IBM Technical Disclosure Bulletin, p. 42.

Friedman, Lubricants for Magnetic Tapes, December 1966, IBM Technical Disclosure Bulletin, p. 779.

WILLIAM D. MARTIN, Primary Examiner

B. D. PIANALTO, Assistant Examiner

U.S. Cl. X.R.

117—138.8, 161, 237